United States Patent [19]

Katz

[11] Patent Number: 5,624,167
[45] Date of Patent: Apr. 29, 1997

[54] APPLIANCE CONTROL MOUNTING

[75] Inventor: Jonathan M. Katz, Louisville, Ky.

[73] Assignee: General Electric Company, Louisville, Ky.

[21] Appl. No.: 416,059

[22] Filed: Apr. 4, 1995

[51] Int. Cl.$^6$ .................................................. G12B 9/00
[52] U.S. Cl. .................... 312/223.1; 312/293.2; 248/27.1; 403/348; 403/315; 403/13
[58] Field of Search .................. 248/27.1; 200/296, 200/294, 295; 361/807; 403/348, 315, 13; 312/252.1, 263, 265.5, 265.6, 228, 222.1, 293.1, 293.2, 293.3, 279, 308; 220/4.02

[56] References Cited

U.S. PATENT DOCUMENTS

| | | | |
|---|---|---|---|
| 2,616,643 | 11/1952 | Budd | 248/27 |
| 4,314,220 | 2/1982 | Ito et al. | 336/65 |
| 4,489,577 | 12/1984 | Crepinsek | 403/348 X |
| 4,715,569 | 12/1987 | Essig et al. | 248/27.1 |
| 5,256,841 | 10/1993 | Zanella | 248/27.1 X |
| 5,323,297 | 6/1994 | Palumbo et al. | 248/27.1 X |
| 5,350,140 | 9/1994 | Ripley et al. | 248/27.1 |

*Primary Examiner*—Peter M. Cuomo
*Assistant Examiner*—Janet M. Wilkens
*Attorney, Agent, or Firm*—H. Neil Houser

[57] ABSTRACT

An electric control mounting includes a control housing having a peripheral wall and a control shaft projecting forward of its front. A base covers the housing front and has an opening through which the shaft extends. A pair of ears extend from the base outward of the peripheral wall on opposite sides of the shaft and lie in a plane parallel to the base. A resilient finger is positioned outward of the peripheral wall and has a tang at its end which projects forward of the base. A mounting plate has an opening to receive the shaft, a pair of mounts formed on opposite sides of the shaft opening and adapted to mate with the ears, and an additional opening adapted to receive the tang as the ears become fully mated with the mounts.

6 Claims, 3 Drawing Sheets

5,624,167

1

APPLIANCE CONTROL MOUNTING

BACKGROUND OF THE INVENTION

Numerous arrangements have been proposed for mounting electric components, such as switches, in various pieces of equipment. U.S. Pat. No. 5,256,841, assigned to General Electric Company the assignee of the present invention, shows and describes an arrangement for mounting components like switches in equipment such as large electric appliances.

Some electric controls are fairly bulky and exert significant forces on their mountings. For example electric controls, like motor driven timers, are used in appliances such as clothes washers and dryers for example. They are relatively large and heavy and timers and other controls which incorporate motors exert torque on their mounting arrangements. Prior arrangements for quickly mounting such electric controls have not been totally satisfactory.

One object of the present invention is to provide an improved mounting for electric controls.

SUMMARY OF THE INVENTION

In accordance with one form of the present invention an electric control mounting comprises an electric control housing with a front, a lateral periphery and a control shaft extending forward of the front. A planar base covers the front and includes an opening through which the shaft extends. A pair of mounting ears extend from the base outward of the housing periphery on substantially opposite sides of the shaft and lie in a plane parallel to the base. A resilient finger is positioned outward of the housing periphery and a tang formed at the end of the finger extends forward of the base. A mounting plate has an opening formed to receive the control shaft, a pair of mounts on substantially opposite sides of the shaft receiving opening and adapted to mate with corresponding ones of the ears, and an additional opening adapted to receive the tang as the ears become fully mated with the mounts.

DETAILED DESCRIPTION OF PREFERRED EMBODIMENT

Figure 1:
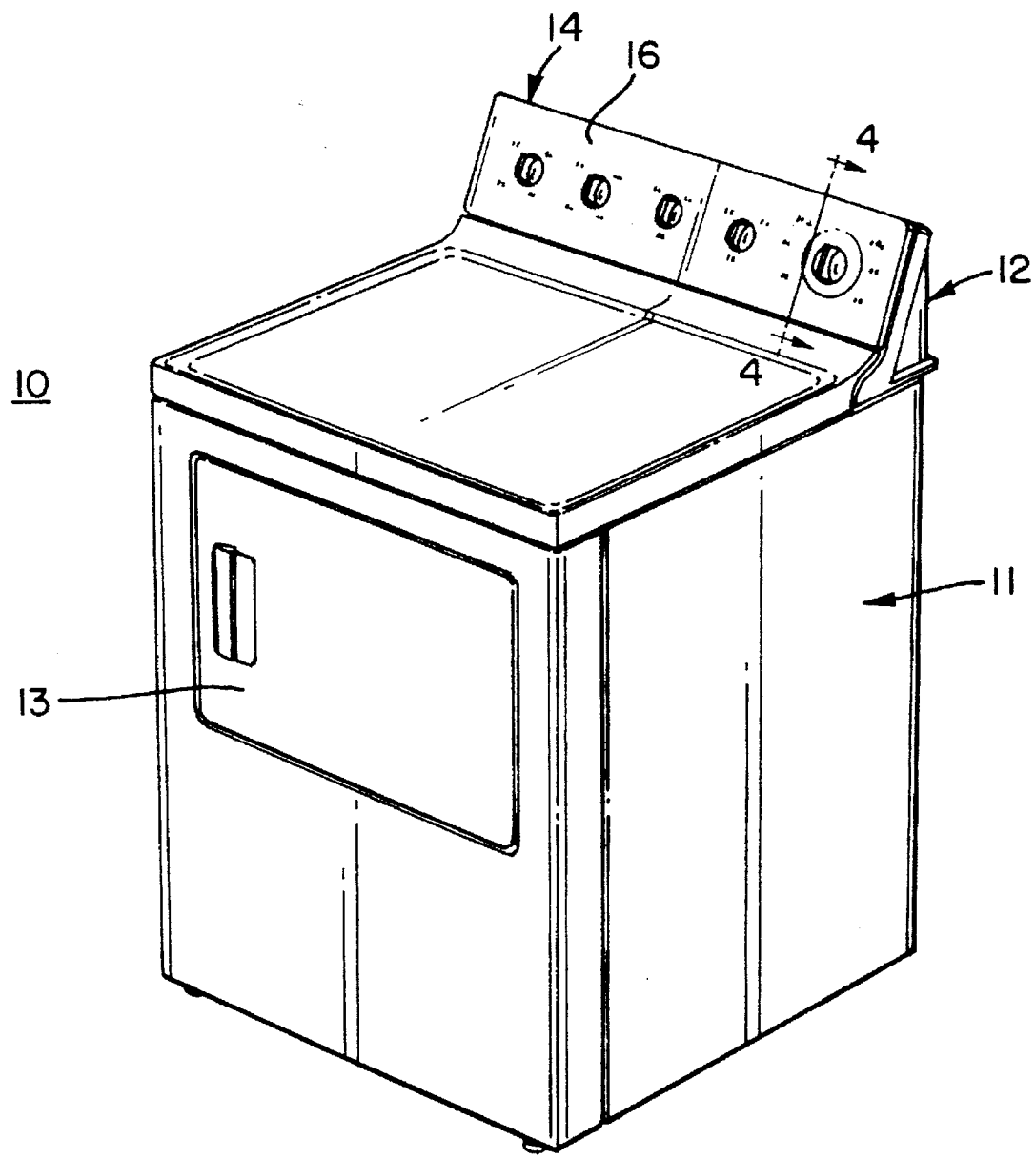
FIG. 1 is a simplified perspective view of a clothes dryer incorporating a control mounting embodying the present invention.

Referring now to FIG. 1, there is shown a clothes dryer 10 incorporating one form the present invention. The dryer 10 includes a cabinet 11 and a control housing 12, generally referred to as a backsplash. A door 13 provides access to the interior of the dryer for loading and unloading fabrics to be dried.

Part of the control housing is a control panel assembly 14, which includes various electric controls for setting and regulating the operation of the dryer. It will be understood that the expression "electric control" is used in a broad sense and includes such items as motor driven timers and end of cycle buzzers or other signal devices, as well as switches that control operation of the dryer motor and heating unit. Other appliances incorporate other electric controls and it will be understood that a clothes dryer, a timer and a buzzer are used herein merely as examples of appliances and electric controls.

Figure 2:
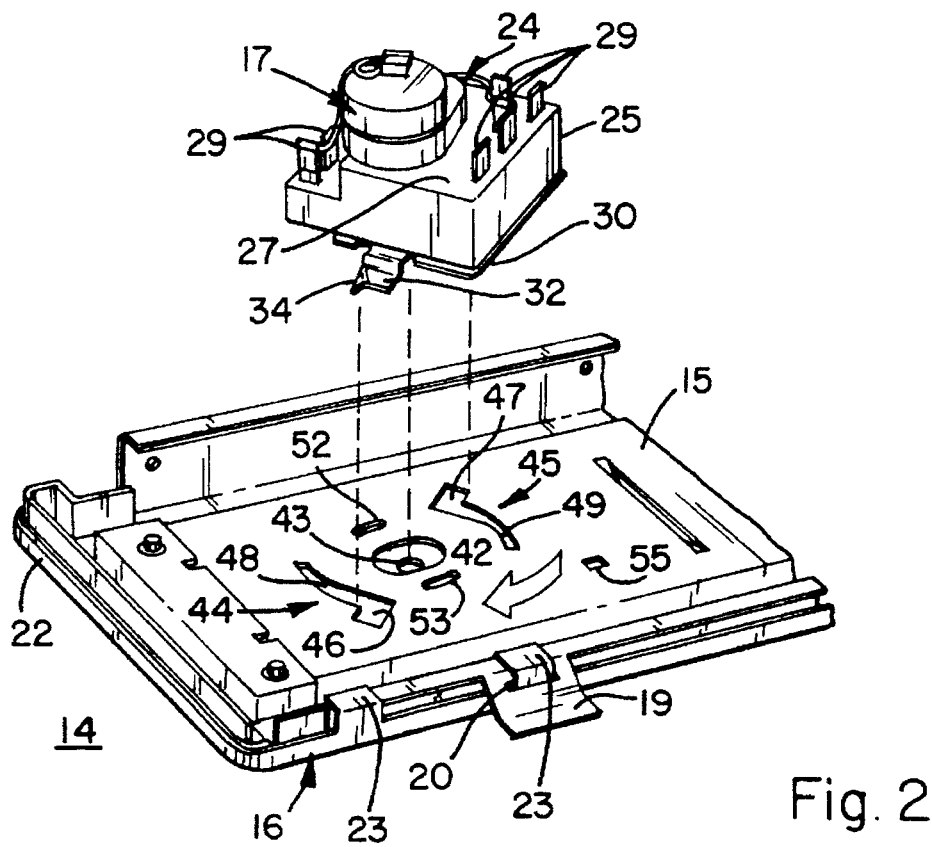
FIG. 2 is a fragmentary rear perspective view of the control panel assembly of FIG. 1, with the timer removed for purposes of illustration.
Figure 3:
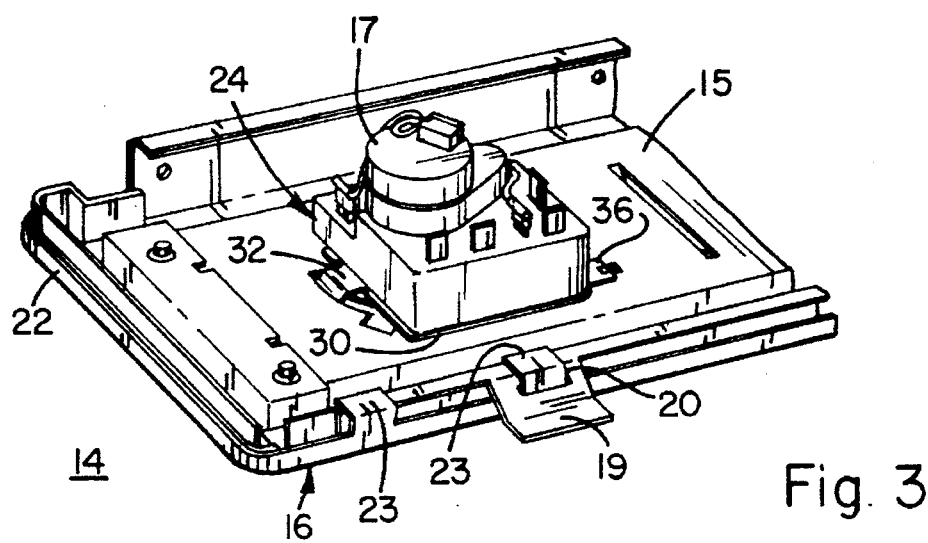
FIG. 3 is a view similar to FIG. 2, but showing the timer in its mounted position.
Figures 4, 5:
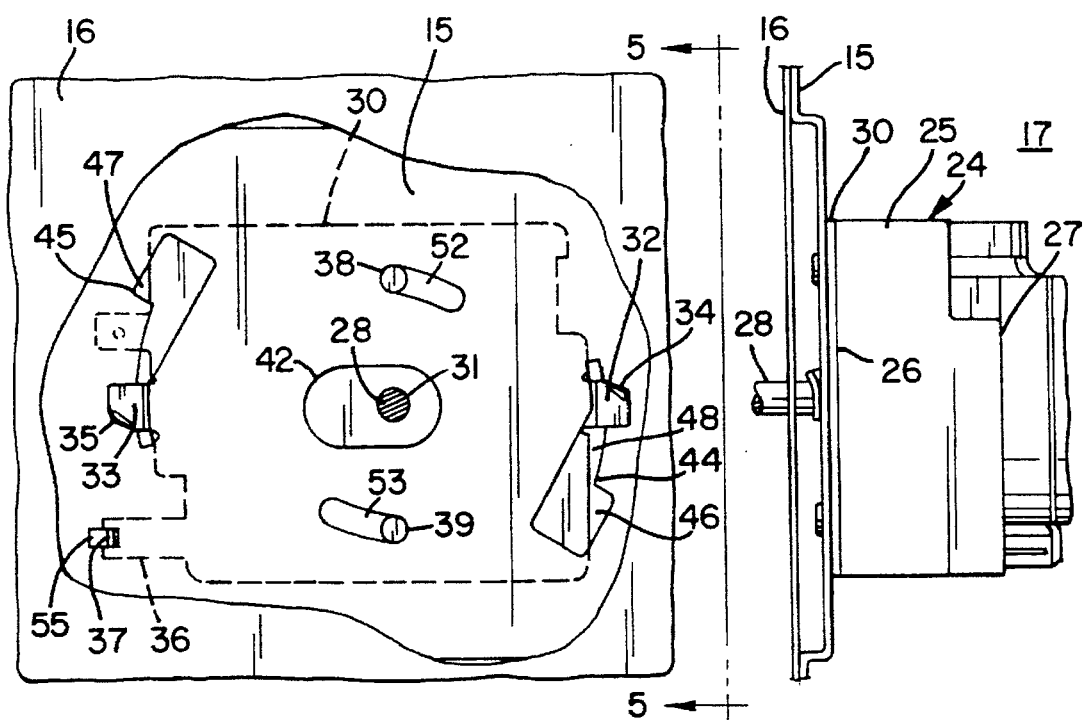
FIG. 4 is a simplified cross section view generally as seen along line 4—4 in FIG. 1.
FIG. 5 is a cross section view generally as seen along line 5—5 in FIG. 4.

Referring particularly to FIGS. 2 and 3, the panel assembly 14 includes a control mounting plate 15 and a cover member 16. The plate is generally planar, is formed of relatively heavy metal, such as sheet steel, and serves as a mounting for various electric controls, such as timer 17. A plurality of tabs 19 project from the lower edge of plate 15 and each tab includes a slot 20.

The cover member 16 conveniently may be formed of a thin sheet of decorative metal and conveniently includes graphic elements as an aid to the user in operating the various controls. The member 16 is generally planar and includes a peripheral rim 22. A plurality of tabs 23 project form the lower edge of rim 22 and correspond to the slots 20. The plate 15 is placed within the rim 22 with the tabs 23 in the slots 20 and the tabs 23 are bent over to secure the plate and cover together. Additional details of the assembly of the plate 15 and cover 16, as well as the mounting of that assembly on the appliance may be had by reference to co-pending application Ser. No. 08/416,172 by Jon Katz et al, entitled Improved Appliance Backsplash Assembly, and assigned to General Electric Company and incorporated herein by reference.

Each of the electric controls, such as the timer 17 for example, conveniently is mounted to the mounting plate 15. Referring particularly to FIGS. 2,3,4 and 5, the timer 17 includes a housing 24 with a peripheral wall 25 and having a front 26 and a back 27. It will be understood that electric controls are not necessarily rectangular and the peripheral wall 25 may have a number of different cross section shapes. A control shaft 28 projects forward from the front 26 of the control housing 24 for the operator to set the timer. Electric power is provided to the timer through terminals 29 projecting through the back 27 of the housing 24. It will be understood that the particular timing mechanism contained in the housing 24 is not part of the present invention and has not been disclosed for the sake of simplicity.

The housing includes a planar base 30 which covers the front 26 of the housing and includes an opening 31 through which the shaft extends. A pair of mounting ears 32,33 project from the base outward of the peripheral wall 25 on substantially opposite sides of the shaft 28 and opening 30. Each ear 32,33 is generally planar in form but may include a bent over corner 34,35 respectively. Each ear is offset forward of the base 30 and the ears lie in a common plane parallel to the plane of the base 30. A resilient finger 36 extends from the base 30 outward of the peripheral wall 25 and lies in the plane of the base. A tang 37 projects from the distal end the finger 36 to a point forward of the base 30. A pair of pins 38,39 project forward of the base 30 on substantially opposite sides of the shaft 28. The pins are spaced outward from the shaft only a small distance and, in any event, less than the distance to the peripheral wall 25.

The mounting plate 15 is configured to cooperate with the housing 24 for quickly mounting the housing on the plate while, at the same time, providing a stable mount for a relatively large and heavy control such as a timer. To this end the plate 15 is provided with an opening 42 through which the shaft 28 passes when the housing is mounted on the plate. A complimentary opening 43 is formed in the cover member 16, through which the shaft also passes. A pair of mounts in the form of arcuate key hole openings 44,45 are formed on substantially opposite sides of the opening 42. The openings 44,45 are adapted to mate with the ears 32,33 respectively. To that end the openings 44,45 include large first portions 46,47 that are sized and positioned to enable the ears 32,33 to pass through the plate 15. The openings 44,45 also include arcuate slot portions 48,49 respectively which receive the offsets in the ears 32,33 so that, when the housing 25 and base 30 are rotated about the axis of shaft 28, the ears 32,33 will be brought into overlapping relationship with the plate 15 adjacent the slot portions 48,49.

A second pair of arcuate openings 52,53 are formed in the plate on substantially opposite sides of opening 42 and are adapted to receive pins 38,39 respectively. The openings 52,53 are sufficiently long to accommodate rotation of the housing 25 and base 30 to move the ears 32,33 well into the slot portions 48,49. On the other hand the slots 52,53 are just sufficiently wide to closely accommodate the pins 38,39. In this manner the slot and pin pairs add to the stability of the mounted control. An additional opening 55 is formed in plate 15 and is adapted to receive tang 37 as the ears 32,33 become fully mated in the slot portions 48,49. This engagement of the tang 37 in the opening 55 prevents subsequent movement of the timer 17 until some tool, such as a screw driver, is used to remove the tang from the opening 55.

The timer 17 is mounted on the plate 15 by inserting the shaft 28 through the openings 42,43 until the ears 32,33 pass through the large portions 46,47 of key hole openings 44,45 and the pins 38,39 are received in openings 52,53. The housing 17 and base 30 are then rotated until the tang 37 is received in opening 55. In that position the ears completely overlap the portions of plate 15 adjacent the slot portions 48,49 and preferably the pins 38,39 are at the ends of slots 52,53. It will be noted that the rotation of the ears 32,33 is such that the leading part of the ears are the bent over 34,35. This assures that the ears and plate 15 will not snag. The wide spacing between the engagement of ear 32 in slot 48 and the engagement of ear 33 in slot 49 provide significant strength and stability to the mounting, which is enhanced by the engagement of pins 38,39 in slots 52,53.

While a specific embodiment of the invention has been illustrated and described herein, it is realized that modifications and changes will occur to those skilled in the art to which the invention pertains. It is therefore to be understood that the appended claims are intended to cover all such modifications and changes as fall within the true spirit and scope of the invention.

What is claimed is:

1. An electric control mounting comprising:

an electric control housing having a front, a lateral periphery and a control shaft extending forward of said front;

a planar base covering said front and including an opening through which said shaft extends;

a pair of pins extending forward of said base on substantially opposite sides of said control shaft;

a pair of mounting ears extending from said base outward of said control housing periphery on substantially opposite sides of said shaft, said ears lying in a plane parallel to said base;

a resilient finger positioned outward of said control housing periphery and a tang formed at the distal end of said finger and extending forward of said base; and a mounting plate, an opening formed in said plate to receive said control shaft, a pair of mounts formed in said plate on substantially opposite sides of said control shaft receiving opening and adapted to mate with said corresponding ones of said ears, and an additional opening formed in said plate and adapted to receive said tang as said ears become fully mated with said mounts, a pair of arcuate slots formed in said mounting plate on substantially opposite sides of said shaft receiving opening, said slots being adapted to closely receive corresponding ones of said pins.

2. An electric control mounting as set forth in claim 1, wherein:

said mounts comprise a pair of arcuate openings formed in said plate; each of said arcuate openings including a first portion sized to permit a corresponding ear to pass through said plate and a slot portion adapted to permit said base to be rotated to bring said corresponding ear into an overlapping relationship with said mounting plate.

3. An electric control mounting assembly comprising:

an electric control housing having a front, a lateral periphery and a control shaft extending forward of said front, a planar base covering said front and including an opening through which said shaft extends, a pair of mounting ears extending from said base outward of said control housing lateral periphery on substantially opposite sides of said shaft, said ears lying in a plane parallel to said base; and a mounting plate, an opening formed in said plate to receive said control shaft, a pair of mounts formed in said plate on substantially opposite sides of said control shaft receiving opening and adapted to mate with said corresponding ones of said ears, said mounts comprising a pair of arcuate openings formed in said plate, each of said arcuate openings including a first portion sized to permit a corresponding ear to pass through said plate and a slot portion adapted to permit said base to be rotated to bring said corresponding ear into an overlapping relationship with said mounting plate.

4. An electric control mounting assembly as set forth in claim 3, wherein said electric control housing further comprises a pair of pins extending forward of said base on substantially opposite sides of said control shaft, and said mounting plate further comprises a pair of arcuate slots formed in said mounting plate on substantially opposite sides of said shaft receiving opening, said slots adapted to closely receive corresponding ones of said pins.

5. An electric control mounting assembly as set forth in claim 3, wherein said electric control housing further comprises a resilient finger positioned outward of said control housing lateral periphery and a tang formed at the distal end of said finger and extending forward of said base, and said mounting plate further comprises an additional opening formed in said plate and adapted to receive said tang as said ears become fully mated with said mounts.

6. An electric control mounting assembly as set forth in claim 5, wherein said electric control housing further comprises a pair of pins extending forward of said base on substantially opposite sides of said control shaft, and said mounting plate further comprises a pair of arcuate slots formed in said mounting plate on substantially opposite sides of said shaft receiving opening, said slots adapted to closely receive corresponding ones of said pins.

* * * * *